(12) United States Patent
Preisach

(10) Patent No.: US 7,835,464 B2
(45) Date of Patent: Nov. 16, 2010

(54) DIGITAL SIGNAL RECEIVER WITH Q-MONITOR

(75) Inventor: Helmut Preisach, Besigheim (DE)

(73) Assignee: Alcatel Lucent, Paris (FR)

( * ) Notice: Subject to any disclaimer, the term of this patent is extended or adjusted under 35 U.S.C. 154(b) by 685 days.

(21) Appl. No.: 11/838,658

(22) Filed: Aug. 14, 2007

(65) Prior Publication Data

US 2008/0292026 A1    Nov. 27, 2008

(30) Foreign Application Priority Data

Aug. 25, 2006    (EP)    .................................. 06300895

(51) Int. Cl.
*H03K 9/00*        (2006.01)
*H04L 27/00*        (2006.01)
(52) U.S. Cl. ........................ 375/316; 341/100; 370/366; 370/536; 370/542
(58) Field of Classification Search ................ 375/316, 375/226, 355, 362, 371; 341/100; 370/536, 370/542, 357, 359–360, 362, 366
See application file for complete search history.

(56) References Cited

U.S. PATENT DOCUMENTS

| 6,275,959 B1 | 8/2001 | Ransijn | |
| 6,760,502 B2 * | 7/2004 | Capik et al. | 385/17 |
| 6,861,888 B2 * | 3/2005 | Hsieh | 327/208 |
| 6,975,649 B1 * | 12/2005 | Roberts et al. | 370/470 |
| 7,170,906 B2 * | 1/2007 | Ofek et al. | 370/498 |
| 7,177,308 B2 * | 2/2007 | Ofek et al. | 370/386 |
| 7,372,813 B1 * | 5/2008 | Cimino et al. | 370/235 |
| 7,650,079 B2 * | 1/2010 | Preisach | 398/164 |
| 2002/0061016 A1 * | 5/2002 | Mullaney et al. | 370/384 |
| 2002/0075845 A1 * | 6/2002 | Mullaney et al. | 370/351 |

FOREIGN PATENT DOCUMENTS

| EP | 0923204 A2 | 6/1999 |
| EP | 1265409 A1 | 12/2002 |
| EP | 1292078 A1 | 3/2003 |
| EP | 1445879 A1 | 8/2004 |
| JP | 59087560 A | 5/1984 |
| JP | 60121853 A | 6/1985 |

\* cited by examiner

*Primary Examiner*—Jean B Corrielus
(74) *Attorney, Agent, or Firm*—Carmen Patti Law Group, LLC

(57) ABSTRACT

A digital signal receiver for a high-bitrate digital signal has a serial signal input (20, 20') and a number of N parallel digital signal outputs (26) with N>1. The receiver contains at least N+1 digital sampling channels (31-35), a Q-monitor (37, 38) for comparing the output signal of at least two of the sampling channels (31-35), and a switch fabric (36) for controllably connecting N of the sampling channels (31-35) to the outputs (26) and at least two of the sampling channels (31-35) to the Q-monitor (37, 38). This allows to use N of the sampling channels to provide the N output signals while at the same time, the at least one remaining sampling channel can be used by the Q-monitor to scan an eye diagram.

11 Claims, 3 Drawing Sheets

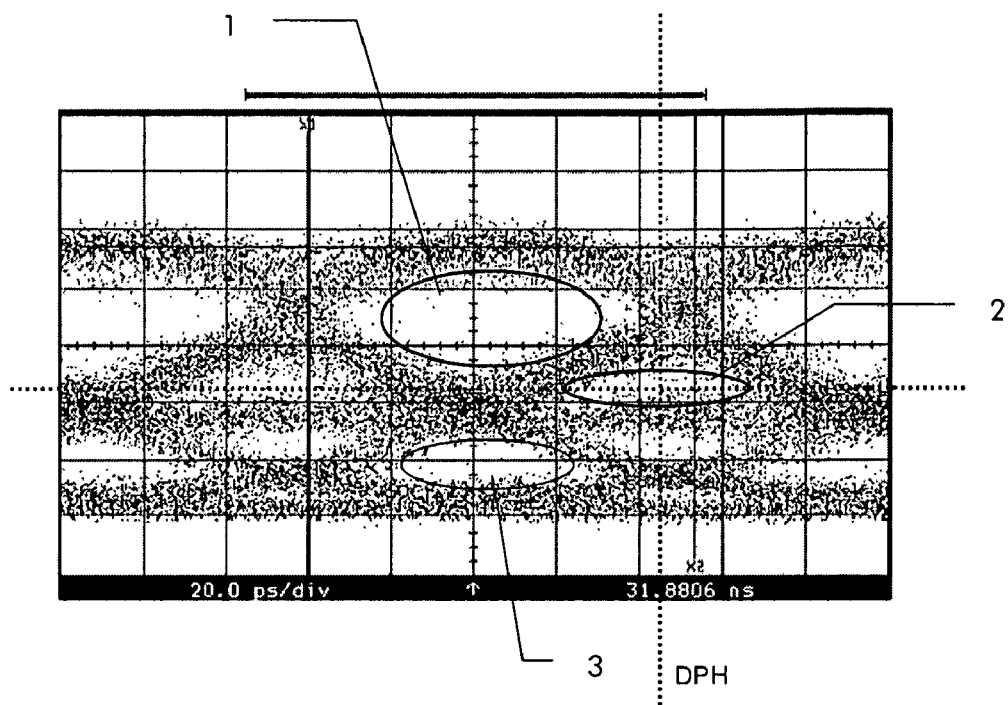

*Fig. 4*

| | Output D0 | Output D1 | Output D2 | Output D3 | Error Cnt | Opt. |
|---|---|---|---|---|---|---|
| 7 | SC0 | SC1 | SC3 | SC4 | SC1+SC2 | SC2 |
| 8 | SC0 | SC2 | SC3 | SC4 | SC0+SC1 | SC1 |
| 1 | SC1 | SC2 | SC3 | SC4 | SC1+SC0 | SC0 |
| 2 | SC0 | SC2 | SC3 | SC4 | SC2+SC1 | SC1 |
| 3 | SC0 | SC1 | SC3 | SC4 | SC3+SC2 | SC2 |
| 4 | SC0 | SC1 | SC2 | SC4 | SC4+SC3 | SC3 |
| 5 | SC0 | SC1 | SC2 | SC3 | SC3+SC4 | SC4 |
| 6 | SC0 | SC1 | SC2 | SC4 | SC2+SC3 | SC3 |
| 7 | SC0 | SC1 | SC3 | SC4 | SC1+SC2 | SC2 |
| 8 | SC0 | SC2 | SC3 | SC4 | SC0+SC1 | SC1 |
| 1 | SC1 | SC2 | SC3 | SC4 | SC1+SC0 | SC0 |
| 2 | SC0 | SC2 | SC3 | SC4 | SC2+SC1 | SC1 |
| 3 | SC0 | SC1 | SC3 | SC4 | SC3+SC2 | SC2 |
| 4 | SC0 | SC1 | SC2 | SC4 | SC4+SC3 | SC3 |
| 5 | SC0 | SC1 | SC2 | SC3 | SC3+SC4 | SC4 |
| 6 | SC0 | SC1 | SC2 | SC4 | SC2+SC3 | SC3 |
| 7 | SC0 | SC1 | SC3 | SC4 | SC1+SC2 | SC2 |
| 8 | SC0 | SC2 | SC3 | SC4 | SC0+SC1 | SC1 |

*Fig. 5*

DIGITAL SIGNAL RECEIVER WITH Q-MONITOR

FIELD OF THE INVENTION

The invention is based on a priority application EP 06300895.7 which is hereby incorporated by reference.

The present invention relates to the field of telecommunications and more particularly to a digital signal receiver with Q-monitor, which can be used in optical transport networks operating at a very high bitrate.

BACKGROUND OF THE INVENTION

The ITU recommendation ITU-T O.201, which is incorporated by reference herein, describes Q-factor measurement equipment, commonly also referred to as a Q-monitor. A Q-monitor is a powerful circuit for performance monitoring of high speed optical signals as well as a sensor for adaptive adjustment of decision threshold, decision phase and other parameters like amplifier gain or equalizer setting in an EDC (Electronic Dispersion Compensation) based receiver.

The basic Q-monitor circuit shown in FIG. 1, which is taken from ITU-T O.201, uses two decision channels, where one channel is operated in the optimum sampling point (regenerated input signal), whereas the other scans the input signal in the amplitude/phase dimensions. The outputs of the two decision channels are compared (EXOR) and integrated (error counter) for different monitor thresholds and phases. This results in a one or two dimensional eye contour. If an algorithm is used to derive from this measurement the optimum decision threshold and phase, the receiver is operated in its optimum sampling point and additionally computes a Q-factor for performance monitoring purposes.

Q-factor measurement is an established method for characterization of optical channels. Particularly at low bit error rates the method has the advantage of taking less time than a traditional BER measurement, which requires to count bit errors over a statistically significant time period. The Q-factor is defined as the (electrical) signal-to-noise ratio at the decision circuit of a digital signal receiver.

A Q-monitor is also described in EP 0 923 204 A2, which is incorporated by reference herein. EP 1 445 879 A1, which is likewise incorporated by reference herein, modifies the basic Q-monitor concept in such a way that the two decision channels can be alternatively operated in monitor and data sampling mode. A crossover switch following the two decision channels selects the appropriate decision channel for the data and the monitor paths. This way, all phase and amplitude offsets in the circuit can be compensated effectively.

Existing Q-monitors are, however, not well suited for highest bitrate applications at well above 10 Gbit/s. Moreover, for further processing of highest bitrate signals (i.e., overhead processing, FEC etc), such signals are typically converted to a parallel format.

It is therefore an object of the present invention to provide a digital signal receiver with Q-monitor, which is suited for highest bitrate applications, preferably at 40 GBit/s and above.

SUMMARY OF THE INVENTION

These and other objects that appear below, are achieved by a digital signal receiver for a high-bitrate digital signal which has a serial signal input and a number of N parallel digital signal outputs with N>1. The receiver contains at least N+1 digital sampling channels, a Q-monitor for comparing the output signal of at least two of said sampling channels, and a switch fabric for controllably connecting N of said sampling channels to said output leads and at least two of said sampling channels to said Q-monitor.

With such design, it is possible to use N sampling channels to provide the N output signals while at the same time, the at least one remaining sampling channel can be used by the Q-monitor to scan an eye diagram. By using in different measurement runs different of the sampling channels to generate the output signals and to scan an eye diagram, all sampling channels can be scanned one after another and operational parameters such as decision phase and/or threshold value optimized. Switch fabric, sampling channels, and Q-monitor can be controlled by a microcontroller, which can be internal or external to the receiver.

Compared to existing implementations, the invention is better suited for 40 Gbps and other high rate applications, as less additional hardware needed for the same level of performance, which increases sensitivity, lowers power consumption and real estate needed on silicon.

A zig-zag or round-robin scheduling reduces the complexity/size of the switch matrix following the decision channels, as only a limited number of cross-points need to be populated.

BRIEF DESCRIPTION OF THE DRAWINGS

Preferred embodiments of the present invention will now be described with reference to the accompanying drawings in which

FIG. 4 shows an eye diagram with optimized decision point; and

FIG. 5 shows zig-zag scheduling rules used in the preferred embodiment of the invention.

DETAILED DESCRIPTION OF THE INVENTION

Figure 1:
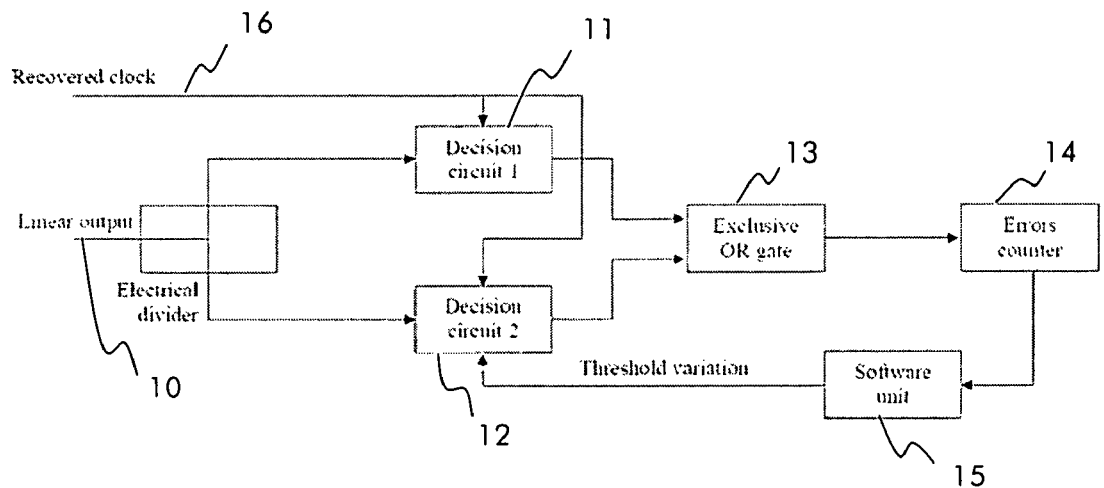
FIG. 1 shows the prior art decision circuit with Q-monitor.

FIG. 1 shows a known decision circuit as described above. A received O/E converted analog input signal 10 is fed to two decision circuits 11 and 12, which are both clocked by a recovered clock signal 16. The output of the two decision circuits 11, 12 is compared by an EXOR gate 13 the output of which is fed to an error counter 14. The count value represents pseudo errors and is used by a software-driven control unit 15 to adjust the threshold of the decision gate 12.

This approach is suitable at moderate bitrates of up to 10 Gbit/s. Higher bitrates typically require parallel processing.

Figure 2:
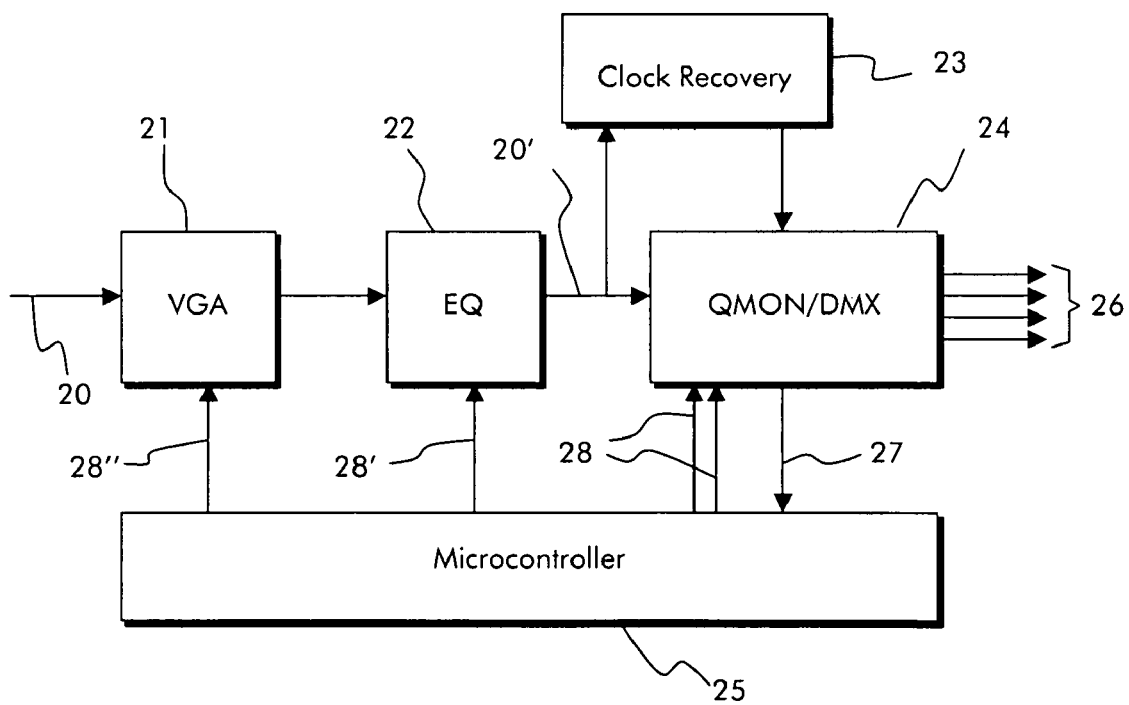
FIG. 2 shows a processor-controlled receiver with Q-monitor.

FIG. 2 shows a receiver with a variable gain amplifier (VGA) 21, an equalizer (EQ) 22, a clock recovery circuit 23, a combined Q-Monitor and demultiplexing circuit 24 and a microcontroller 25. It should be noted that microcontroller 25 also be external to the receiver and can for instance control a larger number of receivers in a network node.

A received O/E converted data signal 20 is first amplified by amplifier 21 and fed to equalizer 22, which compensates for distortions in the signal due to dispersion effects in the optical domain. Equalizer 22 can for instance be implemented as a linear equalizer, a decision-feedback equalizer, or a transversal filter. The equalized signal is branched to clock recovery circuit 23 and Q-monitor and demultiplexing circuit 24. Clock recovery 23 delivers a recovered clock signal to Q-monitor and demultiplexing circuit 24, which outputs a recovered signal 26 in parallel format and a pseudo error signal 27 that is read by microcontroller 25. Responsive to the pseudo error signal 27, microcontroller determines adjustment parameters 28 for phase and/or threshold of the Q-monitor and demultiplexing circuit 24. In addition, microcontroller is preferably also capable to generate adjustment parameters 28', 28" for equalizer 22 and amplifier 21.

Figure 3A:
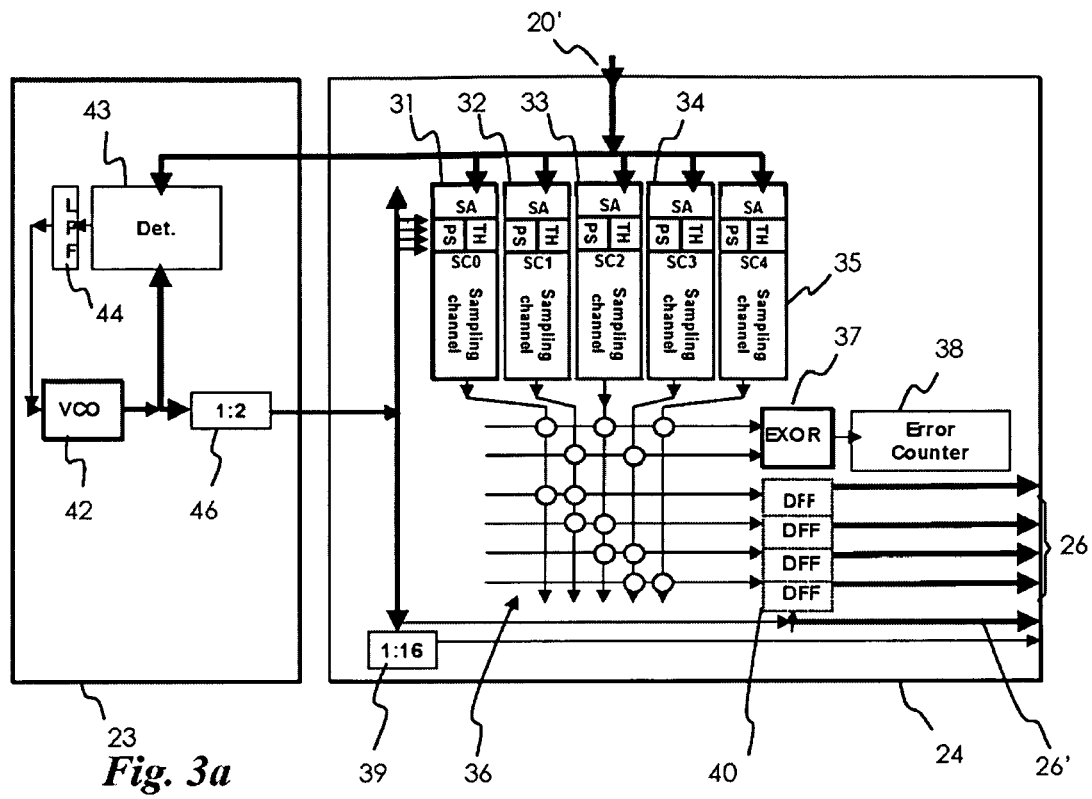
FIG. 3a shows a receiver with Q-monitor according to the invention.

The demultiplexing and Q-monitor circuit 24 and the clock recovery 23 from FIG. 2 are shown in more detail in FIG. 3*a*. The received signal 20' coming from the optional equalizer 22 in FIG. 2 is branched to demultiplexing and Q-monitor circuit 24 and to clock recovery 23. Circuit 24 contains five sampling channels (SC0 to SC4) 31 to 35 receiving in parallel the signal input 20', a switch matrix 36, an EXOR circuit 37, an error counter 38, optional D-flip-flops 40 at the signal output 26 and an optional 1:16 divider for additional clock output.

The five sampling channels 31-35 labeled with SC0 to SC4 are decision gates with adjustable phase and threshold values. Each sampling channel contains a sampler SA, threshold/offset compensation TH, and a phase shifter PS. The phase shifter has a high accuracy of lower than 0.5 ps per step and allows full 4 UI phase shift with respect to 43 Gbit/s clock. Each sampling channel allows a threshold range covering the entire range of the analog input signal. A practically useful value is .+−0.250 mV In a preferred embodiment, the phase shifters of the sampling channels 31-35 are implemented using a simple vector adding approach: Clock signals have a sine wave form. Four copies of the clock signal, mutually shifted by 90°, respectively, are combined in a weighted sum. The result of this weighted sum is again a clock signal but with a phase shift depending on the weighting factors used. By simply adjusting the weighting factors in the phase shifters, any desired phase shifted clock can be created.

It should be noted that instead of four mutually shifted copies of the input clock, two copies at 0° and 90° would also work, if the weighting factors are allowed to be negative.

Via the switch matrix 36, each sampling channel can be alternately connected to the EXOR gate 37 and to one of four parallel output leads 26. The switch matrix 36 is controlled by microcontroller 25 in such a way that the sampling channels 31-35 are connected in alternating order according to a predetermined schedule to the four output leads 26 and the EXOR gate 37.

Depending on the schedule used, it is not necessary that all cross points of the switch matrix 36 are populated with switch elements. In the preferred embodiment, a zig-zag schedule as shown in FIG. 5 is used. The switch matrix is hence populated as shown in FIG. 3*a*. In particular, the switch matrix has the following switch elements:

three switch elements to switch sampling channels 31, 33, or 35 to a first input of EXOR gate 37, two switch elements to switch sampling channels 32 or 34 to a second input of EXOR gate 37, two switch elements to switch sampling channel 31 or 32 to a first output lead, two switch elements to switch, sampling channel 32 or 33 to a second output lead, two switch elements to switch, sampling channel 33 or 34 to a third output lead, and two switch elements to switch, sampling channel 34 or 35 to a fourth output lead.

A basic switch element, which can be used to advantage in the switching matrix is described in EP 1445863, which is incorporated by reference herein.

Each decision gate receives the same signal input 20'. It should be clear however, that the five decision gates do not operate all simultaneously but shifted in time by an amount corresponding to one bit of the input signal, respectively. To accomplish this, the sampling channels are clocked by an actuating clock of ¼ of the data rate of signal 20' and operate at different phase values of the actuating clock. The clock shift is preferably achieved by setting appropriate phase values in each decision gate. For example four sampling channels that are at a time connected to the output leads via switch matrix 36 can have phase values of 0°, 90°, 180°, and 270°, respectively. In the general case with N output leads, the value by which the phases of the individual sampling channels are mutually shifted will be $2\pi/N$.

Alternatively, the sampling channels 31-35 can operate with different clock signals shifted in time with respect to each other. They can also operate on a clock signal corresponding to the bitrate of the input signal. In the latter case, clock dividers, implemented for example by counters, can be connected before the clock input of the sampling channels, respectively.

According to a principle of the invention, the fifth sampling channel is at the same time used to scan the eye diagram of another one of the sampling channels. This will be explained in more detail below with reference to FIG. 5.

The data rate is in the preferred embodiment the rate defined for OTU-3, i.e., 43 Gbit/s. The actuating clock is hence 10.75 GHz.

As an optional improvement of the invention, D ("delay") flip-flops (DFFS) 40 can be provided at the output leads 26. A DFF conveys its input to the output when the clock is strobed. The data output is hence posted at the output one clock cycle after it arrives at the input. The DFFs 40 are clocked by the actuating clock signal 26', so that all four parallel output leads 26 convey their respective output signals at the same clock phase.

Clock signal 26' is further supplied at a clock output lead. In addition, a lower rate clock signal of 1/16 of the actuating clock is derived by clock divider 39 and supplied at a respective low speed clock output to support additional functions (not shown) in the receiver, which are beyond the scope of this invention.

The output of EXOR gate 37 is fed to error counter 38 and counted as pseudo errors. Microcontroller 25 can read out and reset error counter 38 at predetermined intervals, and uses the error count to adjust phase and/or threshold parameters of the sampling channels 31-35 according to an adjustment algorithm.

Various algorithms to determine from an error rate adjustment parameters are known as such and can be implemented by a skilled reader without undue experimentation. The common principle is to adjust the respective parameters such as decision phase and threshold, equalizer parameters, or amplification in such a way as to minimize the error rate. An algorithm which allows to set initial phase and threshold values is described for example in the unpublished European patent application 05292228 entitled "Method and Apparatus for Controlling the Decision Point of a Receiver for Digital Communication Signals" by C. Haslach, which is incorporated by reference herein.

The importance of an accurate control of the decision point in a receiver is illustrated by FIG. 4, which shows an eye diagram of a received signal after passing a dispersive fiber link. Due to dispersion, adjacent bit values overlap and hence cause wrong decision if the decision point is not accurately set. In particular, eyes 1 and 3 are "wrong" eyes but the optimum decision point defined by decision phase DPH and decision threshold DTH lies in the middle of the "right" eye 2.

Coming back to FIG. 3a, the function of the clock recovery 23 is to generate and supply a recovered clock for demultiplex and Q-monitor circuit 24. It basically contains a phase-locked loop consisting of a phase detector 43, a low pass filter 44 and a voltage controlled oscillator (VCO) 42.

VCO 42 delivers a clock signal of 21.5 GHz. Phase detector 43 detects phase offset between a received data pulse and the clock signal from VCO 42 and provides a corresponding adjustment voltage, which after low pass filtering is applied to the control lead of VCO 42. A divider 46 divides the output clock signal of VCO 42 by 2 and supplies four 10.75 GHz clock signals at 0°, 90°, 180°, and 270°, respectively, as actuating clocks to circuit 24.

As already explained, the phase shifters in the sampling channels 31-35 create from these mutually shifted clocks a properly phase shifted clock signal through a simple vector addition. The phase shift can be adjusted by adjusting the weighting factors used.

Alternatively, VCO 42 and phase detector 43 can operate at the full rate of 43 GHz followed by a 1:4 clock divider to generate the 0°, 90°, 180°, and 270° clocks.

Figure 3B:
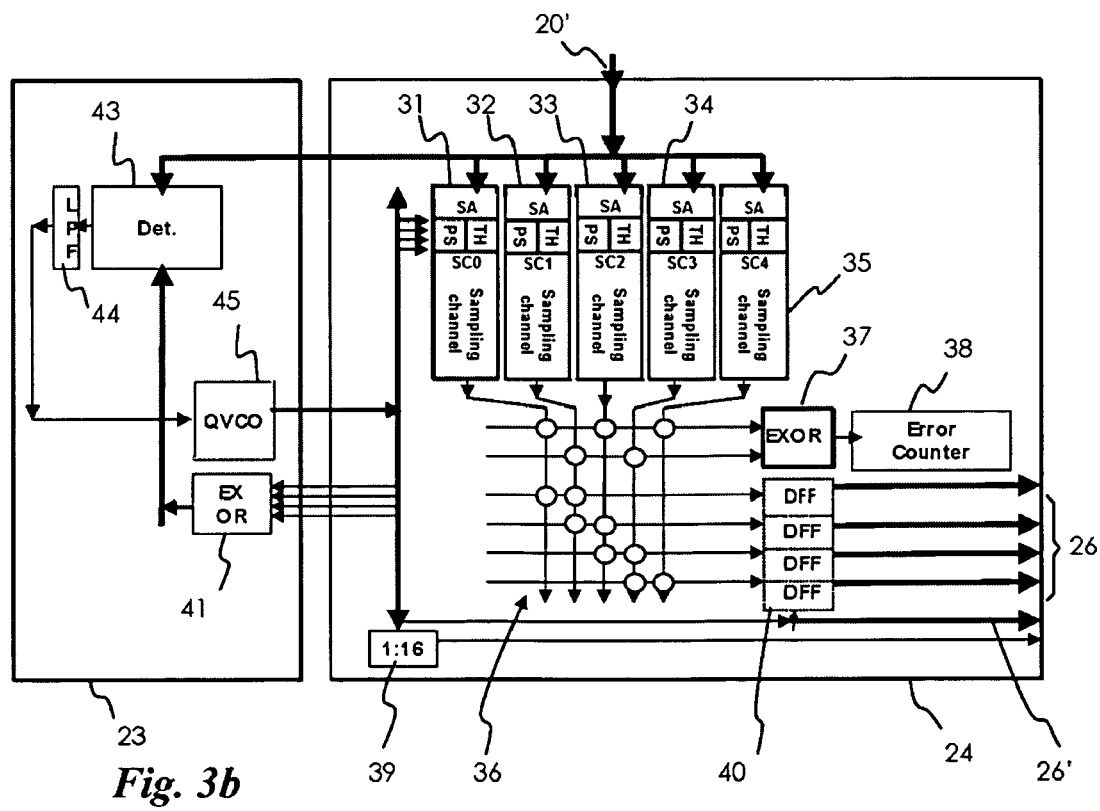
FIG. 3b shows the receiver of FIG. 3a with an alternate clock generator.

An alternate embodiment of the clock recovery 23 is shown in FIG. 3b. In this embodiment, the clock recovery is based on a quarterrate (e.g. 10.75 GHz) quadrature VCO QVCO) 45, which generates the four clocks with 0°, 90°, 180°, and 270° phase relationship. An EXOR gate 41 is used to generate from the 0° and 90° clock outputs of QVCO 45 a 21.5 GHz clock for phase detector 43, which is operated in halfrate mode as in FIG. 3a.

An alternative for the clock recovery based on the quarterrate QVCO 25 is to operate the phase detector 43 with a quarterrate clock (e.g. 10.75 GHz).

An example of the alternating operation of the five sampling channels 31-35 is shown in the table of FIG. 5. Each line of the table corresponds to measurement run of the Q-monitor. The eye diagram measurement as such is carried out as with a conventional Q-monitor, i.e., by varying phase and/or threshold value of the fifth sampling channel during the measurement run and counting pseudo errors for each phase/threshold configuration.

A reasonable time for one measurement is between 1 μs and 100 μs, depending on the accuracy for the Q-factor measurement needed by the controlling algorithm. The measurement times may need to be adapted to the noise distribution of the input signal.

The first four columns indicate which sampling channel is connected through the switch matrix 36 to which one of the four parallel output leads 26. The five sampling channels are identified as SC0, SC1, SC2, SC3, and SC4 and the parallel output leads are identified as DS0, DS1, DS2, and DS3. The fifth column shows, which sampling channels are fed via EXOR gate 37 to error counter 38 during that measurement run. The last column shows, which one of the five sampling channels 31-35 is optimized during the measurement run. This is always the sampling channel, which is not connected to one of the output leads and which phase and threshold values are varied during the measurement run to scan its eye diagram.

So, for instance, in line 1, SC0 is connected to DS0, SC1 to DS1, SC3 to DS2, and SC4 to DS3. EXOR 37 receives at the same time the output of sampling channels SC1 and SC2, which is not used as an active output is scanned and optimized by microcontroller 25.

As can be observed from FIG. 5, assignment of only one output signal is changed from one measurement run to the next. This one is shown grey shaded. For instance from line 1 to line 2, only the sampling channel assigned to output lead DS2 changes from SC1 to SC2, while now SC1 is optimized during the next measurement run.

In FIG. 5, this results in a zig-zag pattern, so that this mode of operation is termed zig-zag schedule. It should be clear that other schedules such as round robin or the like can equally be used, depending on how the switching matrix 36 is designed.

A particular advantage of the described receiver is that it can be used without any modification in the HF-path also for 10 Gbit/s operation by using only one of the sampling channels at a time for data output.

It should be clear that the invention is not limited to a four bit wide parallel data output, but that any other suitable parallel format could equally be implemented in a similar way. For example, while the shown four bit wide output provides nibbles (half-bytes), a two bit parallel output would supply "crumps" (2 bits) and a eight bit wide output would deliver full bytes per clock cycle.

It should also be clear that for an N-bit wide output signal, more than N+1 sampling channels could be provided. In this case, several eye diagrams can be measured in parallel. So, for instance for an 8 bit wide output signal, 10 sampling channels could be provided such that 8 operate to generate the parallel output signals while two are used for Q-monitor measurement.

The invention claimed is:

1. A digital signal receiver for a high bit rate digital signal comprising
   a serial signal input and
   a number of N parallel digital signal outputs with N>1,
   at least N+1 digital sampling channels,
   a Q-monitor circuit for comparing the output signal of at least two of said sampling channels, and
   a switch fabric for controllably connecting N of said sampling channels to said outputs and at least two of said sampling channels to said Q-monitor.

2. A signal receiver according to claim 1, wherein the Q-monitor comprises an EXOR gate and an error counter.

3. A signal receiver according to claim 1, comprising D flip-flops connected between the switch fabric and the outputs.

4. A signal receiver according to claim 1, further comprising a microcontroller for configuring said switch fabric, for reading out pseudo error count values of said Q-monitor and for determining at least one optimized parameter for at least one of said sampling channels connected via said switch fabric to said Q-monitor.

5. A signal receiver according to claim 4, further comprising a variable gain amplifier and/or an electrical equalizer, wherein the microcontroller is adapted to adjust at least one operational parameter of said variable gain amplifier and/or electrical equalizer in dependence on pseudo error count values delivered by said Q-monitor.

6. A signal receiver according to claim 1, wherein said sampling channels are all of equal design, each comprising a sampler responsive to said serial signal input to provide a sample for comparison with a threshold, a threshold/offset compensation for adjusting the threshold, and a phase shifter to provide a phase shifted clock signal for the comparison.

7. A signal receiver according to claim 1, further comprising a clock recovery circuit for generating a recovered clock signal from said input signal.

8. A signal receiver according to claim 7, wherein said recovered clock signal has a clock rate of 1/N of the bit rate of said input signal.

9. A signal receiver according to claim 7, comprising a microcontroller adapted to adjust phase shifters in said N sampling channels connected via said switch fabric to said outputs leads such that these have phase values mutually shifted by $2\pi/N$.

10. A signal receiver according to claim 9, wherein said phase shifters receive from said clock recovery circuit at least two copies of said clock signal, mutually shifted by 90 degrees, wherein said phase shifters are adapted to create a phase shifted clock signal as a weighted sum of said at least two copies of said clock signal and wherein said microcontroller is adapted to adjust the phase shifters by adjusting their weighting factors.

11. A method of regenerating a high bit rate digital signal and converting the high bit rate signal to an N-bit wide parallel output signal with N>1, comprising the steps of providing at least N+1 sampling channels;

connecting N of said sampling channels to a parallel signal output, with at least one sampling channel remaining not connected to a parallel signal output;

connecting two of said sampling channels, including the at least one remaining channel, to a Q-monitor;

using said Q-monitor to measure a one- or two-dimensional eye diagram of the at least one remaining sampling channel by varying a phase and/or threshold value thereof; and repeating said steps using different connections of sampling channels until eye-diagrams for all sampling channels have been measured.

* * * * *